(12) United States Patent
Guen et al.

(10) Patent No.: US 12,731,866 B2
(45) Date of Patent: Sep. 8, 2026

(54) SECONDARY BATTERY

(71) Applicant: SAMSUNG SDI CO., LTD., Yongin-si (KR)

(72) Inventors: Min Hyung Guen, Yongin-si (KR); Chang Mu Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 930 days.

(21) Appl. No.: 18/012,620

(22) PCT Filed: May 3, 2022

(86) PCT No.: PCT/KR2022/006337
§ 371 (c)(1),
(2) Date: Dec. 22, 2022

(87) PCT Pub. No.: WO2023/085537
PCT Pub. Date: May 19, 2023

(65) Prior Publication Data

US 2024/0014514 A1 Jan. 11, 2024

(30) Foreign Application Priority Data

Nov. 10, 2021 (KR) ........................ 10-2021-0153779

(51) Int. Cl.
*H01M 50/486* (2021.01)
*H01M 50/103* (2021.01)
(Continued)

(52) U.S. Cl.
CPC ....... *H01M 50/486* (2021.01); *H01M 50/103* (2021.01); *H01M 50/15* (2021.01); *H01M 50/176* (2021.01); *H01M 50/474* (2021.01)

(58) Field of Classification Search
CPC .. H01M 50/15; H01M 50/103; H01M 50/176; H01M 50/474; H01M 50/486;
(Continued)

(56) References Cited

U.S. PATENT DOCUMENTS 9,147,869 B2 9/2015 Moon
9,653,721 B2 5/2017 Han
(Continued)

FOREIGN PATENT DOCUMENTS

JP 5777093 B2 9/2015
JP 6056254 B2 1/2017
(Continued)

OTHER PUBLICATIONS

International Search Report for PCT/KR2022/006337 dated Aug. 16, 2022, 3 pages.

*Primary Examiner* — Brian R Ohara
*Assistant Examiner* — Brent C Thomas
(74) *Attorney, Agent, or Firm* — Womble Bond Dickinson (US) LLP

(57) ABSTRACT

The present invention relates to a secondary battery in which a first region and a second region of an insulation sheet are made of different materials, and thus thermal conduction between an electrode assembly and a cap plate can be blocked, light reflection that may occur during welding can be prevented, and static electricity and alignment can be maintained. Disclosed in one embodiment is a secondary battery comprising: an electrode assembly having a first electrode tab and a second electrode tab; a first terminal electrically connected to the first electrode tab of the electrode assembly; an insulation sheet having a first region covering the upper side of the electrode assembly and a second region covering both long sides of the electrode assembly; a case accommodating the electrode assembly, the
(Continued)

first terminal, and the insulating sheet; and a cap plate sealing an top opening of the case, wherein in the insulation sheet, the first region further includes a material layer different from that of a second region, and consists of four layers.

16 Claims, 6 Drawing Sheets

(51) Int. Cl.

| | |
|---|---|
| ***H01M 50/15*** | (2021.01) |
| ***H01M 50/176*** | (2021.01) |
| ***H01M 50/474*** | (2021.01) |

(58) Field of Classification Search
CPC ... H01M 50/586; H01M 50/59; H01M 10/654
See application file for complete search history.

(56) References Cited

U.S. PATENT DOCUMENTS

| | | | | |
|---|---|---|---|---|
| 11,245,150 | B2 | 2/2022 | Lee | |
| 2012/0088147 | A1 | 4/2012 | Moon | |
| 2015/0072221 | A1 | 3/2015 | Han | |
| 2019/0027716 | A1* | 1/2019 | Chi | H01M 50/15 |
| 2019/0363316 | A1 | 11/2019 | Lee | |

FOREIGN PATENT DOCUMENTS

| | | | |
|---|---|---|---|
| JP | 2018-170244 | A | 11/2018 |
| KR | 10-1182282 | B1 | 9/2012 |
| KR | 10-2015-0030549 | A | 3/2015 |
| KR | 10-2018-0092670 | A | 8/2018 |

* cited by examiner

SECONDARY BATTERY

CROSS-REFERENCE TO RELATED APPLICATIONS

This application is a U.S. National Phase Patent Application of International Application Number PCT/KR2022/006337, filed on May 3, 2022, which claims priority to Korean Patent Application Number 10-2021-0153779, filed on Nov. 10, 2021, the entire content of each of which is incorporated herein by reference.

TECHNICAL FIELD

Various embodiments of the present invention relate to a secondary battery.

BACKGROUND ART

Unlike a primary battery which may not be charged, a secondary battery is a battery that may be charged or discharged. A low-capacity battery in which one battery cell is packaged in a pack form is used in portable small electronic devices such as mobile phones and camcorders, and a large-capacity battery in which several tens of battery packs are connected in units of battery packs is widely used as a power source for driving motors such as hybrid vehicles and electric vehicles.

A secondary battery may be configured by embedding an electrode assembly and an electrolyte formed by interposing a separator between a positive electrode plate and a negative electrode plate in a case, and installing a cap plate in the case. Here, representative examples of the electrode assembly may include a winding type or a stack type. In the electrode assembly, an uncoated portion tab protrudes upwardly or laterally, and a current collecting member may be connected to the uncoated portion tab.

The above information disclosed in this Background section is only for enhancement of understanding of the background of the invention and therefore it may contain information that does not constitute prior art.

DESCRIPTION OF EMBODIMENTS

Technical Problem

In addition, the present invention provides a secondary battery capable of blocking thermal conduction between an electrode assembly and a cap plate, preventing light reflection that may occur during welding, and maintaining static electricity and alignment.

Additionally, the present invention provides a secondary battery capable of checking foreign matter through vision inspection after welding because an insulation sheet part covering long sides of an electrode assembly can transmit light.

Solution to Problem

A secondary battery according to an embodiment of the present invention may include: an electrode assembly having a first electrode tab and a second electrode tab; a first terminal electrically connected to the first electrode tab of the electrode assembly; an insulation sheet having a first region covering the upper side of the electrode assembly and a second region covering both long sides of the electrode assembly; a case accommodating the electrode assembly, the first terminal, and the insulating sheet; and a cap plate sealing an top opening of the case, wherein in the insulation sheet, the first region further includes a material layer different from that of a second region, and consists of four layers.

The first region may include: a first sheet part that is capable of transmitting light; a second sheet part that is made of a material different from that of the first sheet part and is in close contact with the outer surface of the first sheet part; a fourth sheet part that is in close contact with the inner surface of the first sheet part and includes a conductive material; and a third sheet part that is in close contact with the inner surface of the fourth sheet part and is made of a material different from that of the second sheet part.

The second region may consist of two layers, and may include: a second region first sheet part extended from the first sheet part of the first region; and a second region second sheet part that is in close contact with the inner surface of the second region first sheet part and extends from the fourth sheet part of the first region.

The second sheet part of the first region may be made of yellow polyimide.

The third sheet part of the first region may be made of white polypropylene.

The first sheet part of the first region and the first sheet part of the second region may be made of polypropylene capable of transmitting light.

The fourth sheet part of the first region may include a conductive material in an insulation sheet made of polyethylene or polypropylene.

The first region may include an upper side part interposed between the cap plate shaped of a rectangular plate and the electrode assembly, and two extension parts bent to extend downward from both ends of the upper side part.

The second region may extend downward from lower ends of the two extension parts and may be interposed between the two long sides of the electrode assembly and the case, respectively.

The second region may have uneven roughness on both surfaces.

The second region may consist of three layers and may include: a second region-first sheet part that extends from the first sheet part of the first region; a second region-second sheet part that is close contact with the inner surface of the second region-first sheet part and extends from the fourth sheet part of the first region; and a second region-third sheet part that is that is close contact with the inner surface of the second region-second sheet part and extends from the third sheet part of the first region.

The fourth sheet part of the first region and the third sheet part of the second region may include a conductive material in an insulation sheet made of polyethylene or polypropylene.

The insulation sheet may further include a third region that extends downward from the lower end of the second region and has a color.

The third region may have a different light transmittance from the second region.

The third region may have a light transmittance of 80% or more and 90% or less.

The insulation sheet may have a light transmittance of 90% or more and 100% or less in the second region.

Advantageous Effects of Disclosure

The secondary battery according to an embodiment of the present invention can block thermal conduction between an electrode assembly and a cap plate, prevent light reflection that may occur during welding, and maintain static electricity and alignment.

In addition, in the secondary battery according to an embodiment of the present invention, since the insulation sheet part covering the long sides of the electrode assembly can transmit light, it is possible to check whether or not foreign matter is present through vision inspection after welding.

BEST MODE

Figure 1:
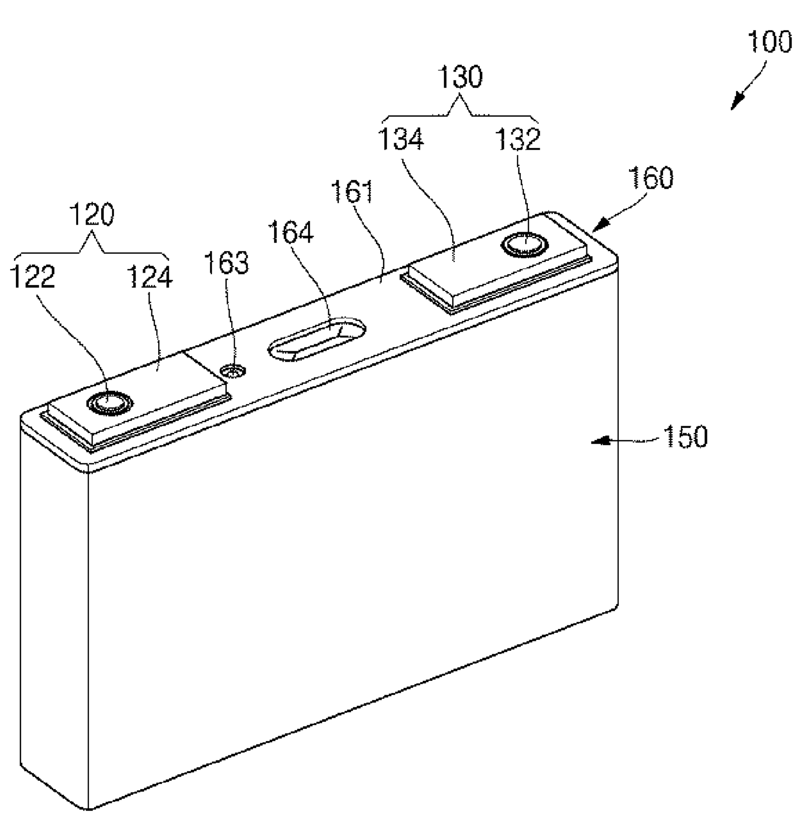
FIG. 1 is a perspective view of a secondary battery according to an embodiment of the present invention.

Hereinafter, a preferred embodiment of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity, and like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the invention. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Here, the same reference numerals are assigned to parts having similar configurations and operations throughout the specification. In addition, when a part is said to be electrically coupled to another part, this includes not only a case where it is directly connected but also a case where it is connected with another element interposed therebetween.

Figure 2:
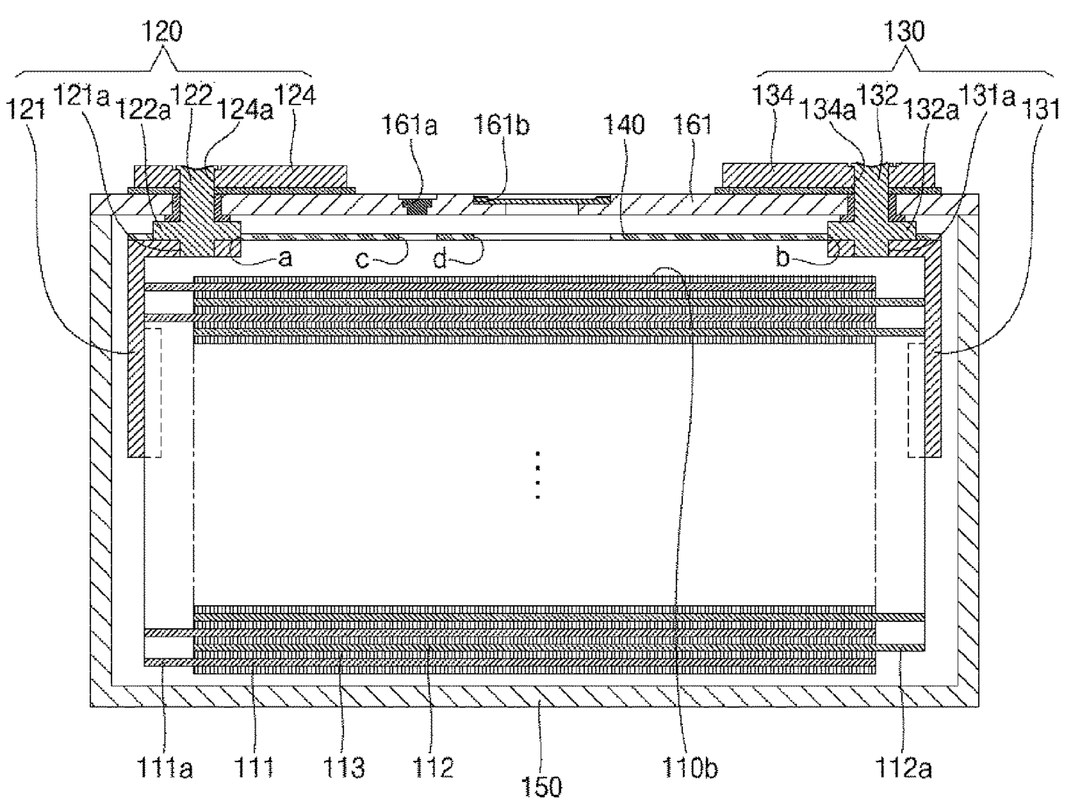
FIG. 2 is a cross-sectional view of a secondary battery according to an embodiment of the present invention.
Figure 3:
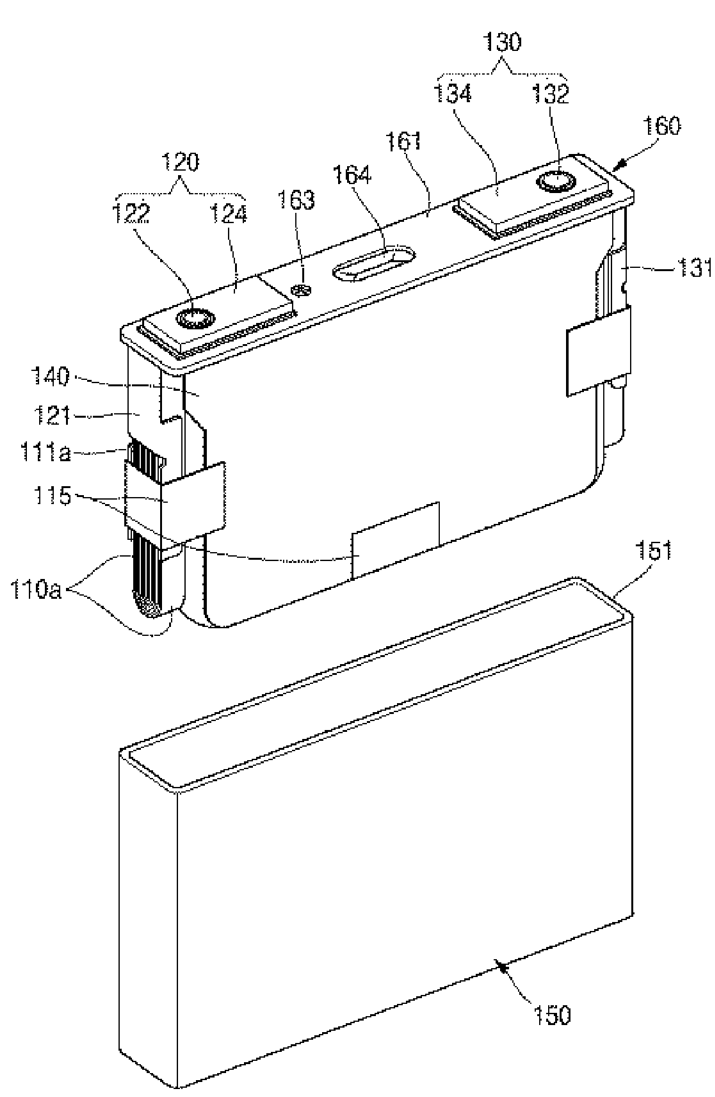
FIG. 3 is an exploded perspective view of a secondary battery according to an embodiment of the present invention.

Referring to FIGS. 1 and 2, perspective and cross-sectional views of a secondary battery are illustrated. In the example shown in FIGS. 1 and 2, the secondary battery 100 may include an electrode assembly 110, a first terminal 120, a second terminal 130, an insulation sheet 140, a case 150, and a cap assembly 160. In addition, referring to FIG. 3, an exploded perspective view showing that the case 150 is exploded in the secondary battery 100 shown in FIG. 1 is illustrated. That is, FIG. 3 shows a state before the case 150 is coupled with the cap assembly 160. Hereinafter, the secondary battery 100 of the present invention will be described with reference to FIGS. 1 to 3.

The electrode assembly 110 may be formed by winding or overlapping a stack of the first electrode plate 111, the separator 113, and the second electrode plate 112 formed in a thin plate shape or film shape. Although FIG. 3 shows the electrode assembly 110 has a winding axis in a horizontal direction (i.e., a direction substantially parallel to the longitudinal direction of the cap assembly 160), the winding axis may be in a vertical direction (i.e., a direction substantially perpendicular to the longitudinal direction of the cap assembly 160). In addition, the electrode assembly 110 may be a stack type rather than a winding type, and the shape of the electrode assembly 110 is not limited in the present invention. In addition, although FIG. 3 shows one single electrode assembly 110, the electrode assembly 110 may include two or more electrode assemblies stacked such that long sides thereof are adjacent to each other, but the number of electrode assemblies 110 is not limited in the present invention.

The first electrode plate 111 of the electrode assembly 110 may serve as a negative electrode, and the second electrode plate 112 may serve as a positive electrode. Of course, the reverse is also possible.

The first electrode plate 111 is formed by applying a first electrode active material such as graphite or carbon to a first electrode current collector formed of a metal foil such as copper, a copper alloy, nickel, or a nickel alloy, and may include a first electrode tab 111*a* (or a first uncoated portion), which is a region to which the first electrode active material is not applied. The first electrode tab 111*a* may serve as a passage for current flow between the first electrode plate 111 and the first terminal 120.

In some examples, the first electrode tab 111*a* may be formed by cutting the first electrode plate 111 so as to protrude to one side in advance when manufacturing the first electrode plate 111, and may be integrally formed with the first electrode plate 111. In some examples, a plurality of first electrode tabs 111*a* may be collected and tack-welded, and the first current collector plate 121 of the first terminal 120 may be welded and coupled to the tack-welded first electrode tabs 111*a*.

The second electrode plate 112 is formed by applying a second electrode active material such as a transition metal oxide to a second electrode current collector formed of a metal foil such as aluminum or aluminum alloy, and may include a second electrode tab 112*a* (or a second uncoated portion), which is a region to which the second electrode active material is not applied. The second electrode tab 112*a* may be a passage for current flow between the second electrode plate 112 and the second terminal 130.

In some examples, the second electrode tab 112*a* may be formed by cutting the second electrode plate 112 so as to protrude to one side in advance when manufacturing the second electrode plate 112, and may be integrally formed with the second electrode plate 112. In some examples, a plurality of second electrode tabs 112*a* may be collected and tack-welded, and the second current collector plate 131 of the second terminal 130 may be welded and coupled to the tack-welded second electrode tabs 112*a*.

In some examples, the first electrode tab 111*a* may be located on one short side of the electrode assembly 110, and the second electrode tab 112*a* may be located on the other short side of the electrode assembly 110.

In some examples, the separator 113 is positioned between the first electrode plate 111 and the second electrode plate 112 to prevent a short circuit and to enable the movement of lithium ions, and may include polyethylene, polypropylene, or a composite film of polyethylene and polypropylene. In addition, the separator 113 may be replaced with an inorganic solid electrolyte such as a sulfide, oxide, or phosphate compound that does not require a liquid or gel electrolyte.

The first terminal 120 and the second terminal 130 electrically connected respectively to the first electrode tab 111*a* of the first electrode plate 111 and the second electrode tab 112*a* of the second electrode plate 112 are located at both ends of the electrode assembly 110. In some examples, In some examples, the electrode assembly 110 may be accommodated in the case 150 together with an electrolyte solution.

In some examples, the electrolyte solution may include a lithium salt such as LiPF6 or LiBF4 in an organic solvent such as EC, PC, DEC, EMC, or DMC. In addition, the electrolyte may be in a liquid or gel phase. In some examples, when an inorganic material-based solid electrolyte is used, the electrolyte solution may be omitted.

The first terminal 120 is made of a metal and may be electrically connected to the first electrode plate 111. In some examples, the first terminal 120 may include a first current collector plate 121, a first terminal pillar 122, and a first terminal plate 124. In some examples, the first current collector plate 121 may come into contact with the first electrode tab 111*a* protruding to one end of the electrode assembly 110. Substantially, the first current collector plate 121 may be electrically connected to the first electrode tab 111*a* by welding. In some examples, the first current collector plate 121 is formed in an approximate "┌" shape, and a terminal hole 121*a* may be formed at an upper portion thereof. In some examples, the first terminal pillar 122 may be inserted into the terminal hole 121*a* and then riveted and/or welded. In some examples, the first current collector plate 121 may be made of copper or a copper alloy.

In some examples, the first terminal pillar 122 penetrates the cap plate 161 of the cap assembly 160 to protrude and extend upward a certain length, and may be electrically connected to the first current collector plate 121 at the lower portion of the cap plate 161. In addition, in some examples, the first terminal pillar 122 protrudes and extends a predetermined length from the top of the cap plate 161, and at the same time, a flange 122*a* may be formed at the lower portion of the cap plate 161 so as to prevent the first terminal pillar 122 from falling out of the cap plate 161. A region of the first terminal pillar 122, which is located below the flange 122*a*, may be inserted into the first terminal hole 121*a* of the first current collector plate 121 to then be rivetted and/or welded. In some examples, the first terminal pillar 122 may be made of copper, a copper alloy, aluminum, or an aluminum alloy.

The first terminal plate 124 has a hole 124*a*, and the first terminal pillar 122 may be coupled to the hole 124*a* and riveted and/or welded. In some examples, interfaces between the upper exposed first terminal pillar 122 and the first terminal plate 124 may be welded to each other. For example, by providing a laser beam to upwardly exposed interface regions between the first terminal pillar 122 and the first terminal plate 124, the interface regions may be melted and then cooled and welded. In some examples, the first terminal pillar 122 and the first terminal plate 124 may be electrically insulated from the cap plate 161.

The second terminal 130 is also formed of metal and may be electrically connected to the second electrode plate 112. In some examples, the second terminal 130 may include a second current collector plate 131, a second terminal pillar 132, and a second terminal plate 134. The second current collector plate 131 may be in contact with the second electrode tab 112*a* protruding to one end of the electrode assembly 110. Substantially, the second current collector plate 131 may be electrically connected to the second electrode tab 112*a* by welding. In some examples, the second current collector plate 131 is formed in a substantially "┐" shape, and a terminal hole 131*a* may be formed at an upper portion thereof. In some examples, The second terminal pillar 132 is inserted and coupled to the terminal hole 131*a*. The second collector plate 131 may be made of, for example, but not limited to, aluminum or an aluminum alloy. The second terminal pillar 132 penetrates the cap plate 161 to be described later to protrude and extend upward a predetermined length, and may also be electrically connected to the second collector plate 131 at the bottom of the cap plate 161. The second terminal pillar 132 protrudes and extends a certain length upward from the cap plate 161, and at the same time, a flange 132*a* is formed at the bottom of the cap plate 161 so as to prevent the second terminal pillar 132 from falling out of the cap plate 161. A region of the second terminal pillar 132, which is located below the flange 132*a*, may be inserted into the second terminal hole 131*a* of the second collector plate 131 to be riveted and/or welded.

In some examples, the second terminal pillar 132 may be made of aluminum or an aluminum alloy. The second terminal plate 134 has a hole 134*a*. In addition, the second terminal plate 134 is coupled to the second terminal pillar 132. That is, the second terminal pillar 132 is coupled to the hole 134*a* of the second terminal plate 134. In addition, the second terminal pillar 132 and the second terminal plate 134 may be riveted and/or welded to each other. In some examples, upwardly exposed interface regions between the second terminal pillar 132 and the second terminal plate 134 may be welded to each other. For example, by providing a laser beam to interface regions between the upwardly exposed second terminal pillar 132 and the second terminal plate 134, the interface regions can be welded to each other by melting and cooling.

In some examples, the second terminal pillar 132 and the second terminal plate 134 may be electrically insulated from the cap plate 161. In some examples, the second terminal pillar 132 and the second terminal plate 134 may be electrically connected to the cap plate 161. At this time, the cap plate 161 of the cap assembly 160 may have the same polarity as the second terminal 130 (e.g., a positive polarity).

Figure 4A:
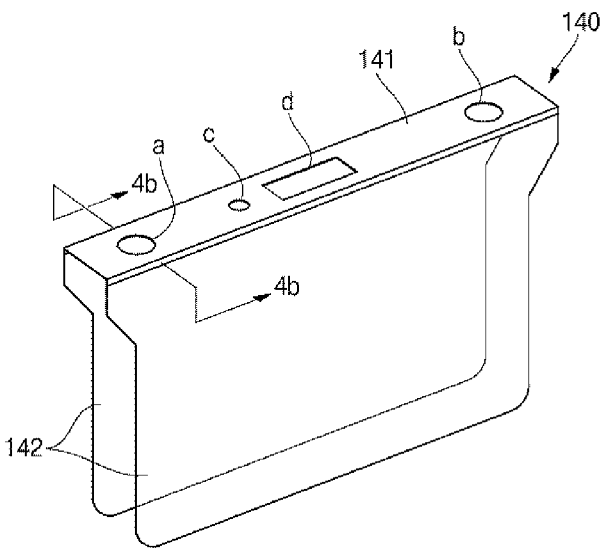
FIGS. 4A and 4B are enlarged perspective views and cross-sectional views of an insulation sheet shown in FIG. 3.

The insulation sheet 140 may be accommodated inside the case 150 together with the electrode assembly 110 while covering a part of the electrode assembly 110. In some examples, the insulation sheet 140 may cover the two long sides 110*a* and the upper side 110*b* of the electrode assembly 110. The insulation sheet 140 may be formed by bending a portion thereof in a flat sheet shape. Referring to FIG. 4A, a perspective view of the insulation sheet 140 is shown, and referring to FIG. 4B, a cross-sectional view of the insulation sheet 140 taken along line 4*b*-4*b* of FIG. 4A is shown. Hereinafter, the insulation sheet 140 will be described with reference to FIGS. 4A and 4B.

The insulation sheet 140 includes a first region 141 interposed between the electrode assembly 110 and the cap assembly 160, and two second regions 142 interposed between the long sides 110*a* of the electrode assembly 110 and the case 150. In the insulation sheet 140, the second regions 142 are located at both sides of the first region 141. In some examples, both surfaces of the second regions 142 may have uneven roughness and may not stick to the surface of the electrode assembly 110. The insulation sheet 140 includes a first region 141 located below the cap plate 161 and substantially parallel to the cap plate 161, and second regions 142 extending downward from both ends of the first region 141. Of course, the insulation sheet 140 is made of an insulating material to prevent an unnecessary electrical short between the electrode assembly 110 and the case 150 and/or the cap assembly 160. In some examples, the insulation sheet 140 may include at least one of polypropylene (PP) and polyimide (PI).

The first region 141 is located below the cap plate 161 and may include a rectangular plate-shaped upper side part 141*a* and two extension parts 141*b* bent to extend downward from both ends of the upper side part 141*a*.

A first terminal hole a and a second terminal hole b may be formed in the first region 141. The first terminal hole a and the second terminal hole b may be positioned symmetrically from the center of the first region 141 in the longitudinal direction. In some examples, the first terminal pillar 122 of the first terminal 120 may be inserted into the first terminal hole a, and the second terminal pillar 132 of the second terminal 130 may be inserted into the second terminal hole b. In some examples, the first region 141 may be seated on the top surfaces of the first current collector 121 and the second current collector 131. The first terminal hole a may be located above the terminal hole 121*a* of the first collector plate 121, and the second terminal hole b may be located above the terminal hole 131*a* of the second collector plate 131. The first terminal 120 and the second terminal 130 pass through the first terminal hole a and the second terminal hole b of the insulation sheet 140, respectively, and then inserted into the terminal hole 121*a* of the first collector plate 121 and the terminal hole 131*a* of the second collector plate 131, respectively, to then be welded.

In the first region 141, an electrolyte injection hole (c) may be further formed at a position corresponding to the electrolyte injection hole 161*a* of the cap plate 161, and a vent hole d may be further formed at a position corresponding to the vent hole 161*b* of the cap plate 161. That is, the electrolyte injection hole (c) of the insulation sheet 140 is located below the electrolyte injection hole 161*a* of the cap plate 161, and the vent hole 161*b* of the insulation sheet 140 is located below the vent hole 161*b* of the cap plate 161. Here, the electrolyte injection hole c may allow the electrolyte solution injected through the electrolyte injection hole 161*a* of the cap plate 161 to be injected into the electrode assembly 110. Here, the vent hole 161*b* of the insulation sheet 140 may transmit pressure to the vent hole 161*b* of the cap plate 161 when the internal pressure is increased by the electrode assembly 110.

The extension parts 141*b* may be bent to extend from the end of the upper side part 141*a* in the long side direction of the electrode assembly 110. The extension parts 141*b* may be bent to extend downward from a longer side of the four ends of the upper side part 141*a*.

The second region 142 may extend downward from the lower end of the extension part 141*b*. In some examples, the second region 142 may include a first sheet part 142*x* through which light is transmitted and a second sheet part 142*y* covering an inner surface of the first sheet part 142*x*.

In some examples, the first sheet part 142*x* of the second region 142 may be made of light-transmitting polypropylene (PP). The first sheet part 142*x* of the second region 142 may have a thickness of any one of 80 μm to 130 μm. When the thickness of the first sheet part 142*x* of the second region 142 is smaller than 80 μm, electrical insulation between the electrode assembly 110 and the case 150 may not be facilitated. When the thickness of the first sheet part 142*x* of the second region 142 is greater than 130 μm, visibility may not be easily achieved during vision inspection.

In some examples, the second sheet part 142*y* of the second region 142 may be an antistatic layer containing a conductive material in an electrical insulating material. The second sheet part 142*y* of the second region 142 may include a conductive material in the form of particles in an insulation sheet made of polyethylene (PE) or polypropylene (PP). In another example, the second sheet part 142*y* of the second region 142 may include a conductive paint in an insulating sheet made of polyethylene (PE) or polypropylene (PP). The second sheet part 142*y* of the second region 142 may have a thickness of any one of 80 μm to 130 μm. When the thickness of the second sheet part 142*y* of the second region 142 is smaller than 80 μm, it may not be easy to form and distribute conductive particles within the sheet. When the thickness of the second sheet part 142*y* of the second region 142 is greater than 130 μm, the thickness may be unnecessarily increased. The second sheet part 142*y* of the second region 142 is an antistatic layer to prevent static electricity, thereby allowing one insulation sheet to be easily picked up in a state in which a plurality of insulation sheets 140 are stacked. In addition, the second sheet part 142*y* of the second region 142 prevents static electricity, thereby facilitating alignment when combining with the first terminal 120, the second terminal 130, and the electrode assembly 110.

In addition, the first region 141 may include a first sheet part 141*x* integrally formed with the first sheet part 142*x* of the second region 142, a second sheet part 141*y* covering the outer surface of the first sheet part 141x, a third sheet part 141z covering the inner surface of the first sheet part 141x, and a fourth sheet part 141zz interposed between the third sheet part 141z and the first sheet part 141x and integrated with the second sheet part 142y of the second region 142. That is, the first region 141 may consist of four layers. The first sheet part 141x may be made of a different material from the second sheet part 141y, the third sheet part 141z, and the fourth sheet part 141zz. The first sheet part 141x may have a different thermal conductivity from the second sheet part 141y, the third sheet part 141z, and the fourth sheet part 141zz.

Here, the first sheet part 141x may be made of polypropylene (PP) capable of transmitting the same light as the first sheet part 142x of the second region 142. Of course, the first sheet part 141x may include a first sheet-upper side part 141ax located below the cap plate 161 and having a rectangular plate shape, and two first sheet-extension parts 141bx bent to extend downward from both ends of the first sheet-upper side part 141ax. Here, the first sheet-extension part 141bx may be parallel to the long sides of the electrode assembly 110. The thickness of the first sheet part 141x may be the same as that of the second region 142, and may be integrally formed with the second region 142. Of course, the first sheet part 141x may have the same light transmittance as the second region 142.

The second sheet part 141y is shaped to correspond to the first sheet part 141x and may be formed to cover the outer surface of the first sheet part 141x. That is, the second sheet part 141y may be interposed between the first sheet part 141x and the cap plate 161. Of course, the second sheet part 141y may be fixed in close contact with the surface of the first sheet part 141x. The second sheet part 141y may be adhered to the outer surface of the first sheet part 141x in the form of a film, or may be formed by coating or printing. An adhesive may be further interposed between the first sheet part 141x and the second sheet part 141y, but the present invention is not limited thereto. The second sheet part 141y is made of polyimide (PI) to block thermal conduction between the electrode assembly 110 and the cap plate 161 and to reinforce insulation. The second sheet part 141y is made of a yellow color, and thus the vision sensing power and detection power for the metal remaining on the upper part of the insulation sheet after welding can be increased. The second sheet part 141y is located below the cap plate 161 and may include a rectangular plate-shaped second sheet-upper side part 141ay and two second sheet-extension parts 141by bent to extend downward from both ends of the second sheet-upper side part 141ay. Here, the second sheet-extension parts 141by may be parallel to the long sides of the electrode assembly 110. The second sheet part 141y may have a thickness of any one of 25 μm to 35 μm. When the thickness of the second sheet part 141y is smaller than 25 μm, it may not be easily to block and insulate thermal conduction between the electrode assembly 110 and the cap plate 161. In addition, when the thickness of the second sheet part 141y is greater than 35 μm, the thickness may be unnecessarily increased, making the secondary battery 100 bulky.

The third sheet part 141z is shaped to correspond to the first sheet part 141x and the second sheet part 141y, and may be formed to cover the inner surface of the fourth sheet part 141zz. That is, the third sheet part 141z may be interposed between the fourth sheet part 141zz and the electrode assembly 110. Of course, the third sheet part 141z may be fixed in close contact with the surface of the fourth sheet part 141zz. The third sheet part 141z may be adhered to the inner surface of the fourth sheet part 141zz in the form of a film, or may be formed by coating or printing. An adhesive may be further interposed between the fourth sheet part 141zz and the third sheet part 141z, but the present invention is not limited thereto. The third sheet part 141z may be made of polypropylene (PP). Preferably, the third sheet part 141z is made of white polypropylene to prevent reflection of light generated when each component of the first terminal 120 or each component of the second terminal 130 is welded. The third sheet part 141z is located above the electrode assembly 110, and may include a rectangular plate-shaped third sheet-upper side part 141az and two third sheet-extension parts 141bz bent to extend downward from both ends of the third sheet-upper side part 141az. Here, the third sheet-extension part 141bz may be parallel to the long sides of the electrode assembly 110. The third sheet part 141z may have a thickness of any one of 80 μm to 130 μm. When the thickness of the third sheet part 141z is smaller than 80 μm, light reflection may not be easily blocked, and when the thickness of the third sheet part 141z is greater than 130 μm, the thickness may be unnecessarily increased, making the secondary battery 100 bulky.

The fourth sheet part 141zz is shaped to correspond to the first sheet part 141x, the second sheet part 141y, and the third sheet part 141z, and may be formed to cover the inner surface of the first sheet part 141x. That is, the fourth sheet part 141zz may be interposed between the first sheet part 141x and the third sheet part 141z. Of course, the fourth sheet part 141zz may be fixed in close contact with the surface of the first sheet part 141x. The fourth sheet part 141zz may be adhered to the inner surface of the first sheet part 141x in the form of a film, or may be formed by coating or printing. An adhesive may be further interposed between the fourth sheet part 141zz and the third sheet part 141z and between the fourth sheet part 141zz and the first sheet part 141x, but the present invention is not limited thereto. The fourth sheet part 141zz may include a conductive material in an insulating sheet made of the same polyethylene (PE) or polypropylene (PP) as the second sheet part 142y of the second region 142. The fourth sheet part 141zz may be integrally formed with the second sheet part 142y of the second region 142. The fourth sheet part 141zz is an anti-static layer to prevent static electricity, thereby allowing one insulation sheet to be easily picked up in a state in which a plurality of insulation sheets 140 are stacked. In addition, the fourth sheet part 141zz prevents static electricity, thereby facilitating alignment when combining with the first terminal 120, the second terminal 130, the electrode assembly 110, and the insulation sheet 140.

In addition, the insulation sheet 140 may be fixed to the electrode assembly 110 by a fixing tape 149. In some examples, the fixing tape 149 may adhere the first collector plate 121 of the first terminal 120 electrically connected to the electrode assembly 110 and the insulation sheet 140 to each other. In addition, the fixing tape 149 may adhere the second collector plate 131 of the second terminal 130 electrically connected to the electrode assembly 110 and the insulation sheet 140 to each other. In addition, the fixing tape 149 may adhere and fix the insulation sheet 140 and the short side or lower surface of the electrode assembly 110 to each other. The fixing tape 149 is a component for fixing the electrode assembly 110 and the insulation sheet 140 to each other, and the adhesion position and number of adhesives may be changed in various manners.

The insulation sheet 140 has a second sheet part 141y provided in the first region 141, and thus can easily block thermal conduction while improving insulation between the electrode assembly 110 and the cap plate 161. In the insulation sheet 140, the third sheet part 141*z* is provided in the first region 141, and thus light reflection can be easily blocked during welding. In addition, since the insulation sheet 140 is capable of transmitting light through the second region 142, the presence or absence of metal particles between the electrode assembly 110 and the insulation sheet 140 can be easily checked by vision inspection through a camera after welding components of the first terminal 120 to each other and welding components of the second terminal 130 to each other. Here, the welding of the components of the first terminal 120 may be welding between the first current collector plate 121 and the first terminal pillar 122 or welding between the first terminal pillar 122 and the first terminal plate 124. In addition, the welding of the components of the second terminal 130 may be welding between the second current collector plate 131 and the second terminal pillar 132 and welding between the second terminal pillar 132 and the second terminal plate 134. In addition, since the fourth sheet part 141*zz* of the first region 141 and the second sheet part 142*y* of the second region 142 are formed as antistatic layers, the insulation sheet 140 can prevent static electricity and facilitate alignment.

The case 150 may have a substantially rectangular parallelepiped shape with an opening 151 formed therein. The electrode assembly 110 and the insulation sheet 140 may be inserted into the case 150 through the opening 151. In addition, the first collector plate 121 of the first terminal 120 and the second collector plate 131 of the second terminal 130 may also be located inside the case 150.

The cap assembly 160 may be coupled to the case 150. In some examples, the cap assembly 160 may include a cap plate 161, a seal gasket 162, a plug 163, a safety vent 164, and an upper coupling member 165. The cap plate 161 may seal the opening 151 of the case 150. The seal gasket 162, made of an insulating material, is formed between the cap plate 161 and the first terminal pillar 122 of the first terminal 120 and between the cap plate 161 and the second terminal pillar 132 of the second terminal 130 to seal a portion between each of the first terminal pillar 122 and the second terminal pillar 132 and the cap plate 161. The seal gasket 162 prevents external moisture from penetrating into the secondary battery 100 or prevents the electrolyte solution contained in the secondary battery 100 from leaking to the outside.

The plug 163 seals the electrolyte inlet 161*a* of the cap plate 161, and the safety vent 164 is installed in the vent hole 161*b* of the cap plate 161 and has a notch 164*a* to be opened at a set pressure.

The upper coupling member 165 may be formed between the cap plate 161 and each of the first terminal pillar 122 and the second terminal pillar 132 on the top of the cap plate 161. In addition, the upper coupling member 165 may be in close contact with the cap plate 161. Moreover, the upper coupling member 165 may also be in close contact with the seal gasket 162. The upper coupling member 165 may insulate the first terminal pillar 122 and the second terminal pillar 132 from the cap plate 161. In some examples, the upper coupling member 165 formed on the second terminal pillar 132 can electrically connect the second terminal plate 134 and the cap plate 161, and thus the second terminal 130 may have the same polarity as that of the cap plate 161.

Figure 4B:
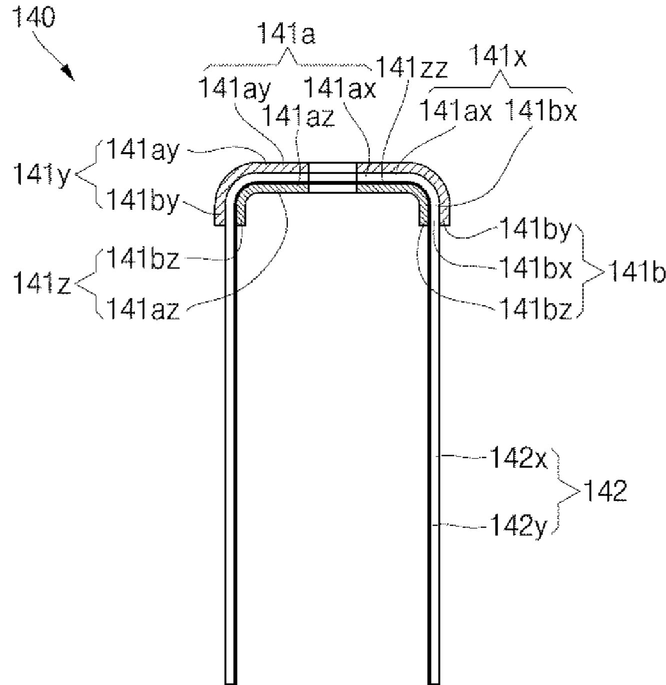
Figure 5:
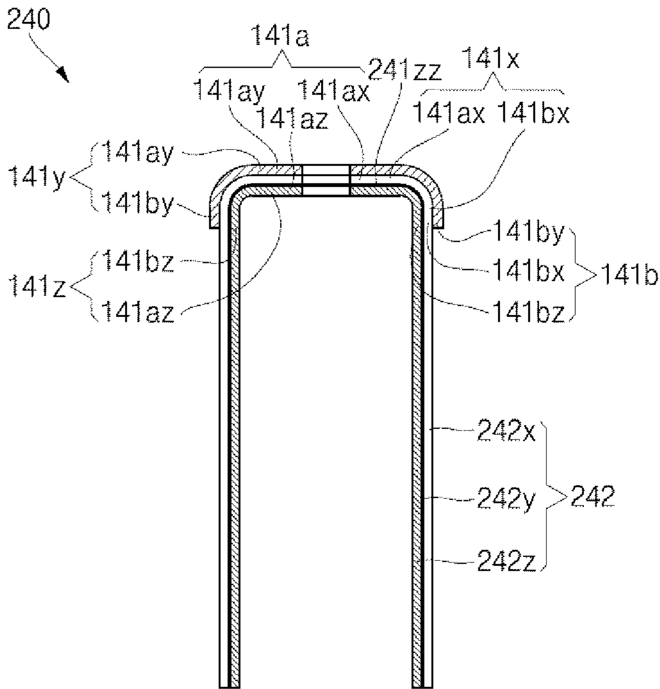
FIG. 5 shows another example of a cross-sectional view of the insulation sheet shown in FIG. 4A.

Referring to FIG. 5, another example of a cross-sectional view of the insulation sheet shown in FIG. 4A is shown. Hereinafter, another example of an insulation sheet 240 of the present invention will be described with reference to FIG. 5. The insulation sheet 240 shown in FIG. 5 is different from the insulation sheet 140 shown in FIG. 4B in that a second region 242 consists of three sheet layers. Hereinafter, the insulation sheet 240 will mainly be described in terms of the second region 242 that is a different feature from the insulation sheet 140 shown in FIG. 4B. The insulation sheet 240 includes a first region 141 interposed between the electrode assembly 110 and the cap assembly 160, and two second regions 242 interposed between the long sides 110*a* of the electrode assembly 110 and the case 150.

The second regions 242 may include a second region-first sheet part 242*x* extending from the first sheet part 141*x* of the first region 141, a second region second sheet part 242*y* extending from the fourth sheet part 141*zz* of the first region 141 while covering the inner surface of the second region-first sheet part 242*x*, and a second region-third sheet part 242*z* extending from the third sheet part 141*z* of the first region 141.

Of course, the first sheet part 242*x* of the second region 242, made of the same material as the first sheet part 141*x* of the first region 141, may be a coating layer or a film. In addition, the second sheet part 242*y* of the second region 242, made of the same material as the fourth sheet part 141*zz* of the first region 141, may be a coating layer or a film. In addition, the third sheet part 242*z* of the second region 242, made of the same material as the third sheet part 141*z* of the first region 141, may be a coating layer or a film. That is, the first sheet part 242*x* of the second region 242 may be made of polypropylene (PP) capable of transmitting light, the second sheet part 242*y* of the second region 242 may be made of white polypropylene (PP), and the third sheet part 242*z* of the second region 242 may include a conductive material contained in an insulation sheet made of polyethylene (PE) or polypropylene (PP).

The insulation sheet 240 has a second sheet part 141*y* provided in the first region 141, and thus can easily block thermal conduction while improving insulation between the electrode assembly 110 and the cap plate 161. In addition, in the insulation sheet 240, the third sheet part 141*z* is provided in the first region 141, and thus light reflection can be easily blocked during welding. Here, the welding may be welding between components of the first terminal 120 and welding between components of the second terminal 130. In addition, since the fourth sheet part 141*zz* of the first region 141 and the second sheet part 142*y* of the second region 142 are formed as antistatic layers, the insulation sheet 240 can prevent static electricity and facilitate alignment.

Figure 6A:
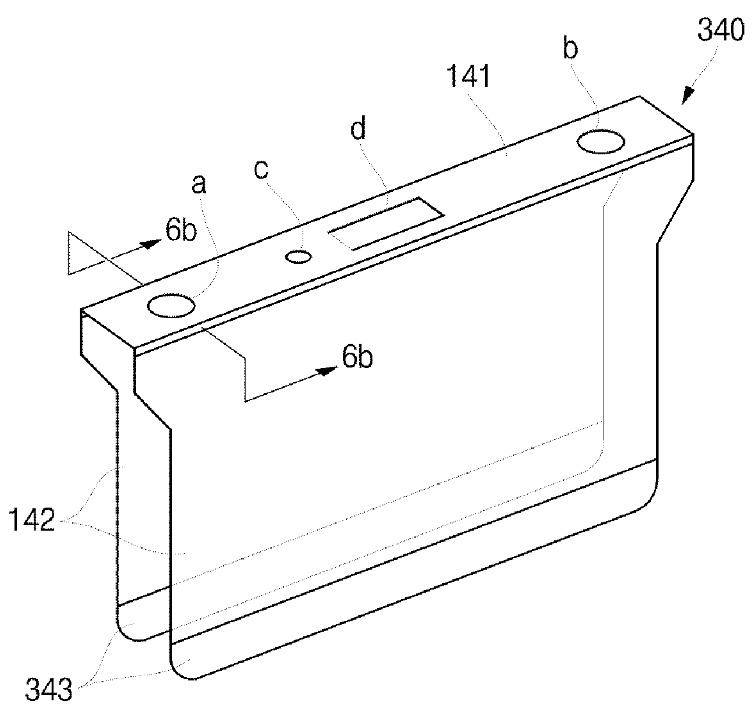
FIGS. 6A and 6B are perspective and cross-sectional views illustrating another example of an insulation sheet of a secondary battery according to the present invention.
Figure 6B:
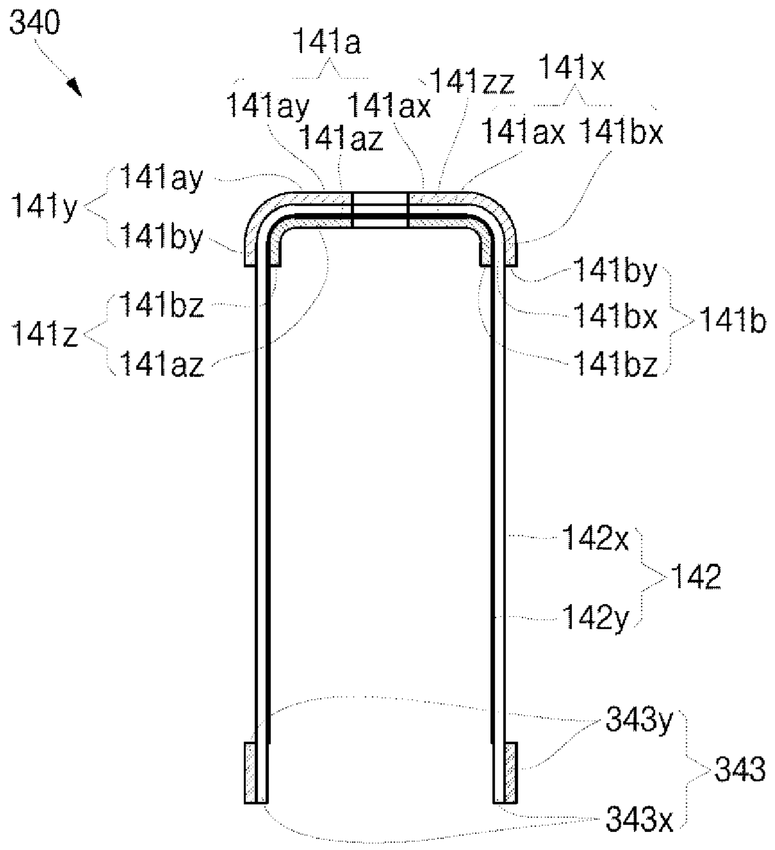

Referring to FIGS. 6A and 6B, perspective and cross-sectional views illustrating another example of an insulation sheet for a secondary battery according to the present invention are shown. Hereinafter, another example of the insulation sheet 340 of the present invention will be described with reference to FIGS. 6A and 6B.

The insulation sheet 340 shown in FIGS. 6A and 6B includes a first region 141, a second region 142, and a third region 343, and differs from the insulation sheet 140 shown in FIGS. 4A and 4B in that the third region 343 is included. Hereinafter, the insulation sheet 340 will be mainly described in terms of a third region 343 that is different from that of the insulation sheet 140 shown in FIGS. 4A and 4B.

The third region 343 may include a first sheet part 343*x* extending downward from the lower end of the first sheet part 142*x* of the second region 142, and a second sheet part 343*y* covering the outer surface of the first sheet part 343*x*. The first sheet part 343*x* of the third region 343 may be integrated with and may be made of the same material and thickness as the first sheet part 142*x* of the second region 142.

The second sheet part 343_y_ of the third region 343 is shaped to correspond to the first sheet part 343_x_ of the third region 343 and may be formed to cover the outer surface of the first sheet part 343_x_. That is, the second sheet part 343_y_ of the third region 343 may be interposed between the first sheet part 343_x_ and the case 150. Of course, the second sheet part 343_y_ may be fixed in close contact with the surface of the first sheet part 343_x_. The second sheet part 343_y_ of the third region 343 may be formed on the outer surface of the first sheet part 343_x_ by coating or printing. The second sheet part 343_y_ is made of polypropylene (PP) having a color, and thus can check whether the lower portion of the insulation sheet 340 is folded or not. Preferably, the second sheet part 343_y_ of the third region 343 may be made of green-series polypropylene. The second sheet part 343_y_ of the third region 343 may have a thickness of any one of 80 μm to 130 μm. When the thickness of the second sheet part 343_y_ of the third region 343 is smaller than 80 μm, color implementation may not be easy, and thus it may be difficult to check whether the lower portion of the insulation sheet 340 is folded or not, and when the thickness of the second sheet part 343_y_ of the third region 343 is greater than 130 μm, the thickness may be unnecessarily increased, making the secondary battery 100 bulky.

Additionally, the third region 343 may further include a third sheet part to cover the inner surface of the first sheet part 343_x_. Here, the third sheet part of the third region 343 may be made of the same material and thickness as the second sheet part 142_y_ of the second region 142, but the present invention is not limited thereto.

The light transmittance of the third region 343 may be different from that of the second region 142. In the third region 343, the second sheet part 343_y_ having a color is further formed on the outer surface of the first sheet part 343_x_ made of the same material and thickness as the first sheet part 142_x_ of the second region 142, and thus the light transmittance thereof may be lower than that of the second region 142.

Preferably, the light transmittance of the third region 343 may have a value of 80% to 90%. When the light transmittance of the third region 343 is smaller than 80%, it may not be easy to perform vision inspection to determine whether or not there is foreign matter through the third region 343. In addition, when the light transmittance is greater than 90%, it may be difficult to determine whether the lower portion of the insulation sheet 340 is folded or not.

While the foregoing embodiments have been provided for carrying out the secondary battery according to the present invention, it should be understood that the embodiment described herein should be considered in a descriptive sense only and not for purposes of limitation, and various changes in form and details may be made therein without departing from the spirit and scope of the disclosure as defined by the following claims.

INDUSTRIAL APPLICABILITY

Various embodiments of the present invention relate to a secondary battery

The invention claimed is:

1. A secondary battery comprising: an electrode assembly having a first electrode tab and a second electrode tab;

a first terminal electrically connected to the first electrode tab of the electrode assembly;

an insulation sheet having a first region covering the upper side of the electrode assembly and a second region covering both long sides of the electrode assembly;

a case accommodating the electrode assembly, the first terminal, and the insulating sheet; and a cap plate sealing a top opening of the case, wherein in the insulation sheet, the first region further includes a material layer different from that of the second region, and consists of four layers.

2. The secondary battery of claim 1, wherein the first region comprises:

a first sheet part that is capable of transmitting light;

a second sheet part that is made of a material different from that of the first sheet part and is in close contact with the outer surface of the first sheet part;

a fourth sheet part that is in close contact with the inner surface of the first sheet part and includes a conductive material; and a third sheet part that is in close contact with the inner surface of the fourth sheet part and is made of a material different from that of the second sheet part.

3. The secondary battery of claim 2, wherein the second region consists of two layers, and comprises:

a second region first sheet part extended from the first sheet part of the first region; and a second region second sheet part that is in close contact with the inner surface of the second region first sheet part and includes a second region-second sheet part that extends from the fourth sheet part of the first region.

4. The secondary battery of claim 3, wherein the first sheet part of the first region and the first sheet part of the second region are made of polypropylene capable of transmitting light.

5. The secondary battery of claim 3, wherein the fourth sheet part of the first region includes a conductive material in an insulation sheet made of polyethylene or polypropylene.

6. The secondary battery of claim 2, wherein the second sheet part of the first region is made of yellow polyimide.

7. The secondary battery of claim 2, wherein the third sheet part of the first region is made of white polypropylene.

8. The secondary battery of claim 2, wherein the second region consists of three layers and comprises:

a second region-first sheet part that extends from the first sheet part of the first region;

a second region-second sheet part that is close contact with the inner surface of the second region-first sheet part and extends from the fourth sheet part of the first region; and a second region-third sheet part that is that is close contact with the inner surface of the second region-second sheet part and extends from the third sheet part of the first region.

9. The secondary battery of claim 8, wherein the fourth sheet part of the first region and the third sheet part of the second region include a conductive material in an insulation sheet made of polyethylene or polypropylene.

10. The secondary battery of claim 1, wherein the first region includes an upper side part interposed between the cap plate shaped of a rectangular plate and the electrode assembly, and two extension parts bent to extend downward from both ends of the upper side part.

11. The secondary battery of claim 10, wherein the second region extends downward from lower ends of the two extension parts and is interposed between the two long sides of the electrode assembly and the case, respectively.

12. The secondary battery of claim 1, wherein the second region has uneven roughness on both surfaces.

13. The secondary battery of claim 1, wherein the insulation sheet further includes a third region that extends downward from the lower end of the second region and has a color.

14. The secondary battery of claim 13, wherein the third region has a different light transmittance from the second region.

15. The secondary battery of claim 13, wherein the third region has a light transmittance of 80% or more and 90% or less.

16. The secondary battery of claim 1, wherein the insulation sheet has a light transmittance of 90% or more and 100% or less in the second region.

* * * * *